US012775422B1

(12) United States Patent
Ziai

(10) Patent No.: US 12,775,422 B1
(45) **Date of Patent: *Oct. 27, 2026**

(54) ARCHITECTURE FOR DRAM CONTROL OPTIMIZATION USING SIMULTANEOUS BIDIRECTIONAL MEMORY INTERFACES

(71) Applicant: Eliyan Corporation, Santa Clara, CA (US)

(72) Inventor: Syrus Ziai, Los Altos, CA (US)

(73) Assignee: Eliyan Corp., Santa Clara, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 19/026,212

(22) Filed: Jan. 16, 2025

Related U.S. Application Data

(63) Continuation of application No. 17/739,007, filed on May 6, 2022, now Pat. No. 12,204,794.

(Continued)

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20;

(Continued)

(56) References Cited

U.S. PATENT DOCUMENTS 4,334,305 A 6/1982 Girardi
5,261,058 A * 11/1993 Squires ................ G06F 3/0601 360/78.12

(Continued)

OTHER PUBLICATIONS

U.S. Appl. No. 16/812,234; Mohsen F. Rad; filed Mar. 6, 2020.

(Continued)

*Primary Examiner* — Daniel C. Chappell
(74) *Attorney, Agent, or Firm* — Lance Kreisman; Peninsula Patent Group

(57) ABSTRACT

A computing device performs both read/write operations concurrently to a memory. Queues for read or write operations are maintained on the memory, allowing the computing device to issue concurrent read/write commands, without complex ordering/buffering circuitry. For a read operation, the memory receives the read command and buffers it in a priority order assigned thereto. The memory can perform the read command and respond with the requested response on a data bus disposed to communicate read data. For a write operation, the memory receives the write command and buffers it for processing in a priority order for that command, such as for relatively immediate processing. The memory can perform the write command using write data on a separate data bus disposed to communication write data.

20 Claims, 3 Drawing Sheets

Related U.S. Application Data

(60) Provisional application No. 63/190,170, filed on May 18, 2021.

(58) Field of Classification Search
CPC ........ G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H03M 7/00–707; H03M 13/00–6597; H03M 99/00; H04L 9/00–38; H04L 12/00–66; H04L 41/00–5096; H04L 49/00–9094; H04L 61/00–59; H04L 67/00–75; H10W 90/00–811; H10W 95/00; H10W 99/00
See application file for complete search history.

(56) References Cited

U.S. PATENT DOCUMENTS 5,396,581 A 3/1995 Mashiko
5,677,569 A 10/1997 Choi
5,892,287 A 4/1999 Hoffman
5,910,010 A 6/1999 Nishizawa
6,031,729 A 2/2000 Berkely
6,055,235 A 4/2000 Blanc
6,417,737 B1 7/2002 Moloudi
6,492,727 B2 12/2002 Nishizawa
6,690,742 B2 2/2004 Chan
6,721,313 B1 4/2004 Van Duyne
6,932,618 B1 8/2005 Nelson
7,027,529 B1 4/2006 Ohishi
7,248,890 B1 7/2007 Raghavan
7,269,212 B1 9/2007 Chau
7,477,615 B2 1/2009 Oshita
7,535,958 B2 5/2009 Best
7,593,271 B2 9/2009 Ong
7,701,957 B1 4/2010 Bicknell
7,907,469 B2 3/2011 Sohn et al.
7,978,754 B2 7/2011 Yeung
8,004,330 B1 8/2011 Acimovic
8,024,142 B1 9/2011 Gagnon
8,121,541 B2 2/2012 Rofougaran
8,176,238 B2 5/2012 Yu et al.
8,468,381 B2 6/2013 Jones
8,483,579 B2 7/2013 Fukuda
8,546,955 B1 10/2013 Wu
8,704,364 B2 4/2014 Banijamali et al.
8,861,573 B2 10/2014 Chu
8,948,203 B1 2/2015 Nolan
8,982,905 B2 3/2015 Kamble
9,088,334 B2 7/2015 Chakraborty
9,106,229 B1 8/2015 Hutton
9,129,935 B1 9/2015 Chandrasekar
9,294,313 B2 3/2016 Prokop
9,349,707 B1 5/2016 Sun
9,379,878 B1 6/2016 Lugthart
9,432,298 B1 8/2016 Smith
9,558,143 B2 1/2017 Leidel
9,832,006 B1 11/2017 Bandi
9,842,784 B2 12/2017 Nasrullah
9,843,538 B2 12/2017 Woodruff
9,886,275 B1 2/2018 Carlson
9,934,842 B2 4/2018 Mozak
9,961,812 B2 5/2018 Suorsa
9,977,731 B2 5/2018 Pyeon
10,171,115 B1 1/2019 Shirinfar
10,394,737 B1 8/2019 Ngo
10,402,363 B2 9/2019 Long et al.
10,410,694 B1 9/2019 Arbel
10,439,661 B1 10/2019 Heydari
10,642,767 B1 5/2020 Farjadrad
10,678,738 B2 6/2020 Dai
10,735,176 B1 8/2020 Heydari
10,748,852 B1 8/2020 Sauter
10,769,073 B2 9/2020 Desai
10,803,548 B2 10/2020 Matam et al.
10,804,204 B2 10/2020 Rubin et al.
10,825,496 B2 11/2020 Murphy
10,826,536 B1 11/2020 Beukema
10,855,498 B1 12/2020 Farjadrad
10,935,593 B2 3/2021 Goyal
11,088,876 B1 8/2021 Farjadrad
11,100,028 B1 8/2021 Subramaniam
11,164,817 B2 11/2021 Rubin et al.
11,204,863 B2 12/2021 Sheffler
11,581,282 B2 2/2023 Elshirbini
11,669,474 B1 6/2023 Lee
11,782,865 B1 10/2023 Kochavi
11,789,649 B2 10/2023 Chatterjee et al.
11,841,815 B1 12/2023 Farjadrad
11,842,986 B1 12/2023 Farjadrad
11,855,043 B1 12/2023 Farjadrad
11,855,056 B1 12/2023 Rad
11,892,242 B2 2/2024 Mao
11,893,242 B1 2/2024 Farjadrad
11,983,125 B2 5/2024 Soni
12,001,355 B1 6/2024 Dreier
12,001,725 B2 6/2024 Chatterjee
2002/0122479 A1 9/2002 Agazzi
2002/0136315 A1 9/2002 Chan
2004/0088444 A1 5/2004 Baumer
2004/0113239 A1 6/2004 Prokofiev
2004/0130347 A1 7/2004 Moll
2004/0156461 A1 8/2004 Agazzi
2005/0041683 A1 2/2005 Kizer
2005/0134306 A1 6/2005 Stojanovic
2005/0157781 A1 7/2005 Ho
2005/0205983 A1 9/2005 Origasa
2006/0060376 A1 3/2006 Yoon
2006/0103011 A1 5/2006 Andry
2006/0158229 A1 7/2006 Hsu
2006/0181283 A1 8/2006 Wajcer
2006/0188043 A1 8/2006 Zerbe
2006/0250985 A1 11/2006 Baumer
2006/0251194 A1 11/2006 Bublil
2007/0281643 A1 12/2007 Kawai
2008/0063395 A1 3/2008 Royle
2008/0086282 A1 4/2008 Artman
2008/0143422 A1 6/2008 Lalithambika
2008/0186987 A1 8/2008 Baumer
2008/0222407 A1 9/2008 Carpenter
2009/0113158 A1 4/2009 Schnell
2009/0154365 A1 6/2009 Diab
2009/0174448 A1 7/2009 Zabinski
2009/0220240 A1 9/2009 Abhari
2009/0225900 A1 9/2009 Yamaguchi
2009/0304054 A1 12/2009 Tonietto
2010/0177841 A1 7/2010 Yoon
2010/0197231 A1 8/2010 Kenington
2010/0294547 A1 11/2010 Hatanaka
2011/0029803 A1 2/2011 Redman-White
2011/0038286 A1 2/2011 Ta
2011/0167297 A1 7/2011 Su
2011/0187430 A1 8/2011 Tang
2011/0204428 A1 8/2011 Erickson
2011/0267073 A1 11/2011 Chengson
2011/0293041 A1 12/2011 Luo
2012/0082194 A1 4/2012 Tam
2012/0182776 A1 7/2012 Best
2012/0192023 A1 7/2012 Lee
2012/0216084 A1 8/2012 Chun
2012/0327818 A1 12/2012 Takatori
2013/0181257 A1 7/2013 Ngai
2013/0222026 A1 8/2013 Havens

(56) References Cited

U.S. PATENT DOCUMENTS

| | | | |
|---|---|---|---|
| 2013/0249290 | A1 | 9/2013 | Buonpane |
| 2013/0285584 | A1 | 10/2013 | Kim |
| 2014/0016524 | A1 | 1/2014 | Choi |
| 2014/0048947 | A1 | 2/2014 | Lee |
| 2014/0126613 | A1 | 5/2014 | Zhang |
| 2014/0192583 | A1* | 7/2014 | Rajan ........................ G11C 5/06 365/63 |
| 2014/0269860 | A1 | 9/2014 | Brown |
| 2014/0269983 | A1 | 9/2014 | Baeckler |
| 2015/0012677 | A1 | 1/2015 | Nagarajan |
| 2015/0046612 | A1 | 2/2015 | Gupta |
| 2015/0172040 | A1 | 6/2015 | Pelekhaty |
| 2015/0180760 | A1 | 6/2015 | Rickard |
| 2015/0206867 | A1 | 7/2015 | Lim |
| 2015/0271074 | A1 | 9/2015 | Hirth |
| 2015/0326348 | A1 | 11/2015 | Shen |
| 2015/0358005 | A1 | 12/2015 | Chen |
| 2016/0056125 | A1 | 2/2016 | Pan |
| 2016/0071818 | A1 | 3/2016 | Wang |
| 2016/0111406 | A1 | 4/2016 | Mak |
| 2016/0217872 | A1 | 7/2016 | Hossain |
| 2016/0294585 | A1 | 10/2016 | Rahman |
| 2017/0255575 | A1 | 9/2017 | Niu |
| 2017/0286340 | A1 | 10/2017 | Ngo |
| 2017/0317859 | A1 | 11/2017 | Hormati |
| 2017/0331651 | A1 | 11/2017 | Suzuki |
| 2018/0010329 | A1 | 1/2018 | Golding, Jr. |
| 2018/0082981 | A1 | 3/2018 | Gowda |
| 2018/0137005 | A1 | 5/2018 | Wu |
| 2018/0175001 | A1 | 6/2018 | Pyo |
| 2018/0190635 | A1 | 7/2018 | Choi |
| 2018/0196767 | A1 | 7/2018 | Linstadt |
| 2018/0210830 | A1 | 7/2018 | Malladi et al. |
| 2018/0315735 | A1 | 11/2018 | Delacruz |
| 2019/0044764 | A1 | 2/2019 | Hollis |
| 2019/0058457 | A1 | 2/2019 | Ran |
| 2019/0108111 | A1 | 4/2019 | Levin |
| 2019/0198489 | A1 | 6/2019 | Kim |
| 2019/0267062 | A1 | 8/2019 | Tan |
| 2019/0319626 | A1 | 10/2019 | Dabral |
| 2020/0051961 | A1 | 2/2020 | Rickard |
| 2020/0105718 | A1 | 4/2020 | Collins et al. |
| 2020/0257619 | A1 | 8/2020 | Sheffler |
| 2020/0320026 | A1 | 10/2020 | Kabiry |
| 2020/0364142 | A1 | 11/2020 | Lin |
| 2020/0373286 | A1 | 11/2020 | Dennis |
| 2021/0056058 | A1 | 2/2021 | Lee |
| 2021/0082875 | A1 | 3/2021 | Nelson |
| 2021/0117102 | A1 | 4/2021 | Grenier |
| 2021/0149763 | A1 | 5/2021 | Ranganathan |
| 2021/0181974 | A1 | 6/2021 | Ghosh |
| 2021/0183842 | A1 | 6/2021 | Fay |
| 2021/0193567 | A1 | 6/2021 | Cheah et al. |
| 2021/0225827 | A1 | 7/2021 | Lanka |
| 2021/0258078 | A1 | 8/2021 | Meade |
| 2021/0311900 | A1 | 10/2021 | Malladi |
| 2021/0365203 | A1 | 11/2021 | O |
| 2021/0405919 | A1 | 12/2021 | K |
| 2022/0051989 | A1 | 2/2022 | Agarwal |
| 2022/0121381 | A1 | 4/2022 | Brewer |
| 2022/0159860 | A1 | 5/2022 | Winzer |
| 2022/0179792 | A1 | 6/2022 | Banerjee |
| 2022/0189934 | A1 | 6/2022 | Kim |
| 2022/0222198 | A1 | 7/2022 | Lanka |
| 2022/0223522 | A1 | 7/2022 | Scearce |
| 2022/0237138 | A1 | 7/2022 | Lanka |
| 2022/0254390 | A1 | 8/2022 | Gans |
| 2022/0327276 | A1 | 10/2022 | Seshan |
| 2022/0334995 | A1 | 10/2022 | Das Sharma |
| 2022/0342840 | A1 | 10/2022 | Das Sharma |
| 2022/0350756 | A1 | 11/2022 | Burstein |
| 2022/0391114 | A1 | 12/2022 | Richter |
| 2023/0039033 | A1 | 2/2023 | Zarkovsky |
| 2023/0068802 | A1 | 3/2023 | Wang |
| 2023/0090061 | A1 | 3/2023 | Zarkovsky |
| 2023/0092541 | A1 | 3/2023 | Dugast |
| 2023/0161599 | A1 | 5/2023 | Erickson |
| 2023/0181599 | A1 | 6/2023 | Du et al. |
| 2023/0289311 | A1 | 9/2023 | Noguera Serra |
| 2023/0359579 | A1 | 11/2023 | Madhira |
| 2024/0007234 | A1 | 1/2024 | Harrington |
| 2024/0028208 | A1 | 1/2024 | Kim |
| 2024/0241840 | A1 | 7/2024 | Im |
| 2024/0273041 | A1 | 8/2024 | Lee |

OTHER PUBLICATIONS

Universal Chiplet Interconnect Express (UCIe) Specification, Revision 1.1, Version 1.0, Jul. 10, 2023.

Hybrid Memory Cube Specification 2.1, Hybrid Memory Cube Consortium, HMC-30G-VSR Phy, 2014.

Quartus II Handbook Version 9.0 Volume 4: SOPC Builder; "System Interconnect Fabric for Memory-Mapped Interfaces"; Mar. 2009.

"Using Dual Port Memory as Interconnect", EE Times, Apr. 26, 2005, Daniel Barry.

"Hot Chips 2017: Intel Deep Dives Into EMIB", TomsHardware.com; Aug. 25, 2017.

"Using Chiplet Encapsulation Technology to Achieve Processing-In-Memory Functions"; Micromachines 2022, 13, 1790; https://www.mdpi.com/journal/micromachines; Tian et al.

"Multiport memory for high-speed interprocessor communication in MultiCom;" Scientia Iranica, vol. 8, No. 4, pp. 322-331; Sharif University of Technology, Oct. 2001; Asgari et al.

Block Memory Generator v8.2 LogiCORE IP Product Guide Vivado Design Suite; Xilinx; Apr. 1, 2015.

Kurt Lender et al., "Questions from the Compute Express Link Exploring Coherent Memory and Innovative Cases Webinar", Apr. 13, 2020, CXL consortium.

Planet Analog, "The basics of SerDes (serializers/deserializers) for interfacing", Dec. 1, 2020, Planet Analog.

Farjadrad et al., "A Bunch of Wires (B0W) Interface for Inter-Chiplet Communication", 2019 IEEE Symposium on High-Performance Interconnects (HOTI), pp. 27-30, Oct. 2019.

Universal Chiplet Interconnect Express (UCIe) Specification Rev. 1.0, Feb. 24, 2022.

Brinda Ganesh et. al., "Fully-Buffered DIMM Memory Architectures: Understanding Mechanisms, Overheads and Scaling", 2007, IEEE, 2007 IEEE 13th International Symposium on High Performance Computer Architecture, pp. 1-12 (Year: 2007).

Anu Ramamurthy, "Chiplet Technology & Heterogeneous Integration" Jun. 2021, NASA, 2021 NEPP ETW, slides 1-17 (Year: 2021).

Wikipedia, "Printed circuit board", Nov. 9, 2021, Wayback Machine, as preserved by the Internet Archive on Nov. 9, 2021, pp. 1-23 (Year: 2021).

* cited by examiner

System 100
120
DRAM
ASIC
110
130
Command and Address
141
143
140
Write Transaction
131
144
Write Addr 1
Write Data 1
Driven by ASIC
Read Transaction
142
Read Addr 1
Read Data 1
Driven by DRAM
Addr Bus
Data bus System 100

System 100

ARCHITECTURE FOR DRAM CONTROL OPTIMIZATION USING SIMULTANEOUS BIDIRECTIONAL MEMORY INTERFACES

INCORPORATED DISCLOSURES

Priority Claim. This application is a Continuation of U.S. patent application Ser. No. 17/739,007, filed May 6, 2022, entitled ARCHITECTURE FOR DRAM CONTROL OPTIMIZATION USING SIMULTANEOUS BIDIRECTIONAL MEMORY INTERFACES, which a Non-Provisional that claims priority to U.S. Provisional Application No. 63/190,170, filed May 18, 2021, entitled NOVEL ARCHITECTURE FOR DRAM CONTROL OPTIMIZATION USING SIMULTANEOUS BIDIRECTIONAL MEMORY INTERFACES, which is incorporated herein by reference in its entirety.

This Application incorporates by reference the following documents.

- U.S. Provisional Appl. 63/190,170, filed May 18, 2021, in the name of first inventor Syrus Ziai, titled "Novel architecture for DRAM control optimization using simultaneous bidirectional memory interfaces".
- U.S. Provisional Appl. 63/283,265, filed Nov. 25, 2021, in the name of first inventor Ramin Farjadrad, titled "Enabling advance system-in-package architectures at low-cost using high-bandwidth ultra-short-reach (USR) connectivity in MCM packages".
- U.S. Provisional Appl. 63/295,524, filed Dec. 31, 2021, in the name of first inventor Ramin Farjadrad, titled "Innovative low-cost packaging solutions for system in package and the HBM crossover PHY architecture".
- U.S. application Ser. No. 16/812,234, filed Mar. 6, 2020, in the name of first inventor Mohsen F. Rad, titled "Low cost solution for 2.5D and 3D packaging using USR chiplets".
- U.S. Provisional Appl. 63/184,842, filed May 6, 2021, in the name of first inventor Syrus Ziai, titled "Implementing complex system-in-package architectures leveraging high-bandwidth long-reach die-to-die connectivity over MCM package substrates".
- U.S. application Ser. No. 17/737,966, filed May 5, 2022, in the name of first inventor Ramin Farjadrad, titled "Complex system-in-package architectures leveraging high-bandwidth long-reach die-to-die connectivity over MCM package substrates".

This Application also claims priority of the following documents, and all documents which those documents incorporate by reference.

- U.S. Pat. No. 10,572,416, issued Feb. 25, 2020, titled "Efficient signaling scheme for high-speed ultra short reach interfaces".
- U.S. Pat. No. 10,642,767, issued May 5, 2020, titled "Efficient signaling scheme for high-speed ultra short reach interfaces".
- U.S. Pat. No. 10,552,353, issued Feb. 4, 2020, titled "Simultaneous bidirectional serial link interface with optimized hybrid circuit".
- U.S. Pat. No. 10,855,498, issued Dec. 1, 2020, titled "Efficient signaling scheme for high-speed ultra short reach interfaces".
- U.S. application Ser. No. 16/365,510, filed Mar. 26, 2019, titled "Multi-chip module with configurable multi-mode serial link".
- U.S. application Ser. No. 16/867,442, filed May 5, 2020, titled "Efficient signaling scheme for high-speed ultra short reach interfaces".

- U.S. application Ser. No. 17/108,519, filed Dec. 1, 2020, titled "Efficient signaling scheme for high-speed ultra short reach interfaces".
- U.S. application Ser. No. 17/521,612, filed Oct. 8, 2021, titled "Efficient signaling scheme for high-speed ultra short reach interfaces".

These documents are hereby incorporated by reference as if fully set forth herein. Techniques described in this Application can be elaborated with detail found therein. These documents are sometimes referred to herein as the "Incorporated Disclosures," the "Incorporated Documents," or variants thereof.

COPYRIGHT NOTICE

A portion of the disclosure of this patent document contains material subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

This background is provided as a convenience to the reader and does not admit to any prior art or restrict the scope of the disclosure or the invention. This background is intended as an introduction to the general nature of technology to which the disclosure or the invention can be applied.

Communication between computing devices and memories, such as between ASICs and dynamic RAM (DRAM), generally involves at least one communication link for the computing device to direct which memory cell (or group thereof) the memory device should access, and at least one communication link for the computing device to direct what data the memory device should read from or write to that memory cell (or group thereof). For example, the computing device can be coupled to the memory device using (first) a command/address bus, which the computing device can use to direct the memory device whether to read or write data (and with respect to which address location to read or write data), and (second) a data bus, which the computing device can use to specify the actual data the memory device should read or write.

One problem that has arisen in the art is that there is often a substantial delay between when the computing device wishes to read data from the memory, and a response by the memory with its answer. This prompts the computing device to reserve a delayed time slot, on a communication link between the computing device and the memory, to receive data from the memory. In contrast, when the computing device wishes to write data to the memory, the computing device is generally capable of communicating that data to be written right away.

However, when the time slot to write data has already been reserved to read data, the computing device must often wait to communicate the data it wishes to write to the memory. If any substantial number of write operations are delayed, the computing device might have to buffer those write operations, including their write locations (thus, memory addresses) and their data to write, while read operations between the computing device and the memory proceed. The communication link between the computing device and the memory might also be inefficiently used if read operations prevent write operations from being timely placed on the communication link.

This conflict between read operations and write operations can also involve relatively complex circuitry on the computing device to manage the ordering and priority of read operations and write operations. Moreover, when the computing device uses more than one bank of memory, such as when the computing device is coupled to more than one memory device, the circuitry on the computing device can also be involved with managing the selection and ordering of read operations and write operations with respect to multiple memory devices, such as to optimize the bandwidth and latency with respect to those read operations and write operations. Designing and placing circuitry on the computing device can be expensive.

Conflict between read operations and write operations can also involve undesirable use of buffer space and circuitry on the computing device. For example, the computing device might have to maintain a buffer of read operations or write operations. Any such buffer can become longer than desired and can take up a substantial amount of complexity and space on, or power requirements of, the computing device. More specifically, requirements for logic for buffering read operations or write operations can be complex and can have both space and power requirements that designers of the computing device might prefer to use for other functions.

Each of these issues, as well as other possible considerations, might relate to aspects of interactions between computing devices and memory devices, including the ordering and priority of read operations and write operations, the allocation of space and power for circuitry and logic to manage those operations, and related matters.

SUMMARY OF THE DISCLOSURE

This summary of the disclosure is provided as a convenience to the reader and does not limit or restrict the scope of the disclosure or the invention. This summary is intended as an introduction to more detailed description found in this Application, and as an overview of techniques explained in this Application. The described techniques have applicability in other fields and beyond the embodiments specifically reviewed in detail.

Among other disclosures, this Application describes a system, and techniques for use, capable of performing both read operations and write operations concurrently with one or more memory devices. In one embodiment, one or more queues and/or buffers for read operations and/or write operations are maintained on the memory device, allowing the computing device to issue concurrent read commands and write commands, without requiring complex ordering or buffering circuitry on the computing device, or at least allowing the computing device to use only relatively simplified ordering or buffering.

BRIEF DESCRIPTION OF THE FIGURES

In the figures, like references generally indicate similar elements, although this is not strictly required.

Figure 1:
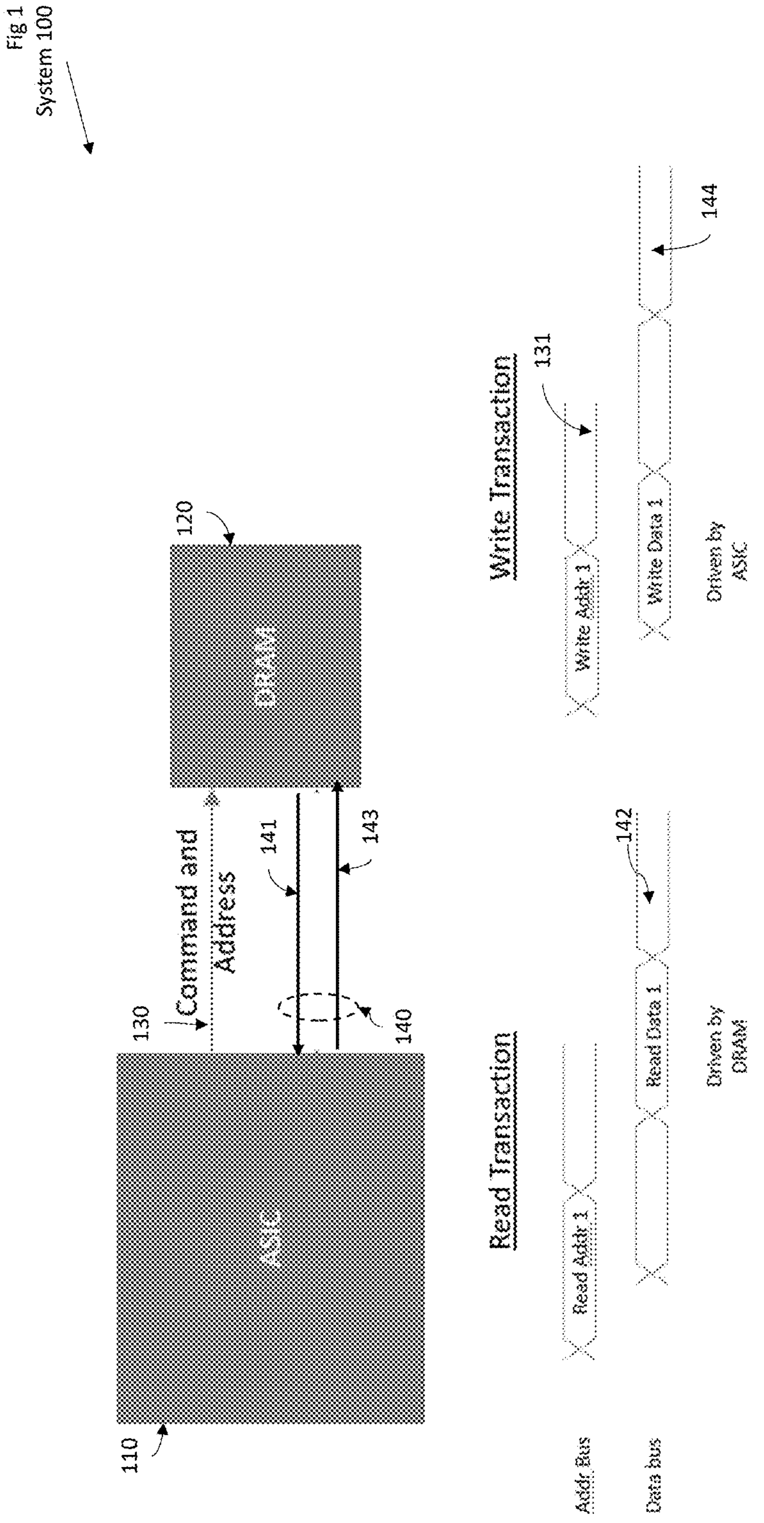
FIG. 1 shows a conceptual drawing of a system including an interface between a computing device and a memory using interleaved read and write transactions.

After reading this Application, those skilled in the art would recognize that the figures are not necessarily drawn to scale for construction, nor do they necessarily specify any particular location or order of construction.

DETAILED DESCRIPTION

General Discussion

In one embodiment, a computing device can perform both read operations and write operations concurrently with one or more memory devices.

In one embodiment, one or more queues and/or buffers for read operations and/or write operations are maintained on the memory device, allowing the computing device to issue concurrent read commands and write commands, without requiring complex ordering or buffering circuitry on the computing device, or at least allowing the computing device to use only relatively simplified ordering or buffering.

In one embodiment, when a computing device issues a command for a read operation, the memory device receives the read command and buffers that command in a priority order assigned to that command, such as for relatively immediate processing, or otherwise as specified by a system designer or by the computing device. The memory device can perform the read command and respond with the requested response thereto on a communication link (or "bus") directed from the memory device to the computing device, such as a data bus disposed to communicate read data. When the memory device performs the read command, it can respond with the read data on the communication link directed from the memory device to the computing device.

In one embodiment, when the computing device issues a command for a write operation, the memory device receives the write command and buffers that command for processing in a priority order for that command, such as for relatively immediate processing, or otherwise as specified by a system designer or by the computing device. The memory device can receive data associated with the write command on a separate communication link (or "bus") directed from the computing device to the memory device. When the memory device performs the write command, it can respond with an acknowledgement on the communication link directed from the memory device to the computing device, or on a command/acknowledgement bus disposed to communicate acknowledgements.

Because the communication link (sometimes referred to herein as a "communication bus" or a "bus") from the memory device to the computing device, disposed to communicate read data, is separate from the communication link from the computing device to the memory device, disposed to communicate write data, there is no particular requirement to allocate separate time slots on either communication link for read data and write data. This can have the effect that the computing device and the memory device can communicate read commands/responses and write commands/responses bidirectionally and without substantial delay.

Because the memory device can perform buffering and priority ordering of read operations and write operations without explicit instruction by the computing device, the computing device can operate without relatively complex circuitry to perform that buffering or priority ordering. For example, the computing device can make do with relatively simple buffering or priority ordering (such as in response to multiple requests for read/write operations from distinct subassemblies within the computing device), or in some cases, with almost no buffering or priority ordering circuitry.

This can have the effect that the computing device can allocate space for circuitry, wiring, power; reduce the size, cost, or design complexity of the ASIC; or otherwise assign such circuitry, wiring, or power to functions preferred by a designer thereof.

Because the memory device can perform buffering and priority ordering of read operations and write operations without explicit instruction by the computing device, the memory device can operate without instruction by the computing device to optimize read operations and write operations with more than one memory bank. For example, the memory device can reorder or otherwise group read operations and write operations to provide that such operations can be directed to multiple memory banks in a manner that optimizes the number of operations performed by each memory bank, without the computing device having to be involved in any such optimization.

Because the computing device and the memory device can communicate bidirectionally without having to reserve time slots for delayed responses, the communication links between the two devices can operate more efficiently and without substantial wasted capacity. This can have the effects that fewer read/write operations are delayed, and that fewer read/write operations are buffered to wait while other operations are performed.

In one embodiment, the computing device can include an application-specific integrated circuit (ASIC), a processor, a central processing unit (CPU), a graphics processing unit (GPU), a tensor processing unit (TPU), a video processing unit (VPU), or another type of AI or ML device, a cryptography unit, a system-on-a-chip (SoC), a floating-point gate array (FPGA), another type of computing device that can interface with one or more memory devices, or a combination or conjunction of multiple ones or multiple types of such devices. In one embodiment, the memory device can include a dynamic RAM (DRAM), static RAM (SRAM), another type of memory such as a static RAM (SRAM), a synchronous DRAM (SDRAM), a double-data rate SDRAM (DDR), a low-power DDR (LPDDR), a high-bandwidth memory (HBM), a memory cache, a multi-level memory such as including one or more levels of cache and a memory device, a database, another type of memory device that can interface with one or more devices, or a combination or conjunction of multiple ones or multiple types of such devices.

Terms and Phrases

The following terms and phrases are exemplary only, and not limiting.

The phrases “this application”, “this description”, and variants thereof, generally refer to any material shown or suggested by any portions of this Application, individually or collectively, and including all inferences that might be drawn by anyone skilled in the art after reviewing this Application, even if that material would not have been apparent without reviewing this Application at the time it was filed.

The phrases “computing device”, and variants thereof, generally refer to any device (or portion thereof) that might be disposed to issue read and/or write commands to a “memory device”, such as described herein, or multiple ones or multiple types of such memory devices, whether in parallel or series, whether to one or more separate or banks thereof, whether to a distributed or singular such device, whether to a logically local or remote such device, or otherwise as described herein. For example, the computing device can include an application-specific integrated circuit (ASIC), a processor, a processor, a central processing unit (CPU), a graphics processing unit (GPU), a tensor processing unit (TPU), a video processing unit (VPU), or another type of AI or ML device, a cryptography unit, a system-on-a-chip (SoC), a floating-point gate array (FPGA), another type of computing device that can interface with one or more memory devices, a combination or conjunction of multiple ones or multiple types of such devices, or otherwise as described herein.

The phrases “memory device”, and variants thereof, generally refer to any device (or portion thereof) that might be disposed to receive read and/or write commands from a “computing device”, such as described herein, or multiple ones or multiple types of such computing devices, whether in parallel or series, whether to one or more separate or banks thereof, whether to a distributed or singular such device, whether from a logically local or remote such device, or otherwise as described herein. For example, the memory device can include a dynamic RAM (DRAM), static RAM (SRAM), another type of memory such as a static RAM (SRAM), a synchronous DRAM (SDRAM), a double-data rate SDRAM (DDR), a low-power DDR (LPDDR), a high-bandwidth memory (HBM), a memory cache, a multi-level memory such as including one or more levels of cache and a memory device, a database, another type of memory device that can interface with one or more devices, a combination or conjunction of multiple ones or multiple types of such devices, or otherwise as described herein.

The phrases “communication link”, “communication bus”, “bus”, and variants thereof, generally refer to any device (or portion thereof) that might be disposed to send information from a first device to a second device, whether or not that information is retained at the first device, whether or not that information is acknowledged or assured to be received by the second device, whether or not that information undergoes substantial delay or is transmitted by intermediate devices, or otherwise as described herein. For example, a communication link can include an electrical, optical, or electro-optical coupling between the first and second devices, a circuit-switched or packet-switched network including the first and second devices, a redundant modular or otherwise reliable distributed communication system, or otherwise as described herein.

After reviewing this Application, those skilled in the art would recognize that these terms and phrases should be interpreted in light of their context in the specification.

FIGURES AND TEXT

FIG. 1—Interleaved Read and Write Transactions

FIG. 1 shows a conceptual drawing of a system including an interface between a computing device and a memory using interleaved read and write transactions.

In one embodiment, a system 100 can include one or more of: a computing device 110, a memory device 120, a command/address communication link 130, and a data communication link 140.

The computing device 110 can include an ASIC or another device disposed to issue read and/or write commands to the memory device 120. The memory device 120 can include a DRAM or another device disposed to receive read commands and/or write commands from the computing device 110. The communication links 130 and/or 140 are also sometimes referred to herein as a “bus” or “busses” 130 and/or 140.

In one embodiment, the command/address bus 130 can include one or more time slots 131, each disposed to communicate an address (such as a read address associated with a read command, or a write address associated with a write command). The command/address bus 130 can also include one or more typically much shorter time slots (not shown) associated with specific commands indicating whether the associated command is a read command or a write command and/or acknowledgements of those read commands or write commands.

Separate Read/Write Communication Links

In one embodiment, the data bus 140 can be disposed to logically include a read communication link 141, such as controlled by the memory device 120. The read communication link 141 can include a sequence of read-data time slots 142 each allocated solely to read data to be communicated from the memory device 120 to the computing device 110. The data bus 140 can be disposed to logically include a write communication link 143, controlled by the computing device 110. The write communication link 143 can include a sequence of write-data time slots 144 each allocated solely to write data to be communicated from the computing device 110 to the memory device 120.

As the read communication link 141 is separate from the write communication link 143, read data can be communicated using the read-data time slots 142 on the read communication link 141 concurrently with write data being communicated using the write-data time slots 144 on the write communication link 143. This can have the effect that both the read communication link 141 and the write communication link 143 can operate concurrently. Thus, the computing device 110 and the memory device 120 need not allocate extra read-data time slots 142 or write-data time slots 144.

As described herein, the command/address bus 130 can include one or more (typically much shorter) time slots (not shown), each of which can indicate whether the associated command is a read command or a write command, and each of which can include an acknowledgement of a read command or a write command. In alternative embodiments, acknowledgements of read commands or write commands can be disposed on one or more (typically much shorter) time slots (not shown), on the read communication link 141 or write communication link 143.

As described herein, the read communication link 141 and the write communication link 143 can include separate physical wires suitable for communicating electromagnetic signals (thus, in parallel and possibly concurrently), or can be combined into a single physical wire suitable for communicating multiple electromagnetic signals (thus, possibly concurrently). In the latter case, the single physical wire can be disposed to communicate the multiple electromagnetic signals concurrently or simultaneously, thus, with the effect that read operations and write operations can be performed at the same time.

Read/Write Communication Delays

As the read communication link 141 is separate from the write communication link 143, a (read) delay between issue of a read command on the command/data bus 130 and an associated read-data time slot 142 on the read communication link 141 need not have any particular relationship to a (write) delay between issue of a write command on the command/data bus 130 and an associated write-data time slot 144 on the write communication link 143. Similarly, a (read) delay between issue of a read command and an associated acknowledgement thereof, need not have any particular relationship to a (write) delay between issue of a write command and an associated acknowledgement thereof. However, in practice it is common for a (read) delay between issue of a read command and an associated acknowledgement thereof, and for a (write) delay between issue of a write command and an associated acknowledgement thereof, to each occur on a clock cycle associated with the interface between the computing device 110 and the memory device 120.

While the figure shows a delay of about half of a read-data time slot 142 between issue of a read command from the computing device 110 and a response from the memory device 120 with associated read data, the actual delay would likely be driven by delay incurred by the memory device 120 itself. For example, when the memory device 120 includes a multi-level memory (or when the memory device 120 includes a relatively larger DRAM with a relatively larger number of memory banks or a relatively slower access time), the actual delay incurred by the memory device 120 might depend on whether the requested data was found in a memory cache (a “cache hit”) or whether the requested data had to be requested from a slower and relatively more voluminous non-cache memory device (a “cache miss”). There is no particular requirement that the actual delay is in fact about half of a read-data time slot 142; it might be shorter or longer.

Similarly, while the figure also shows a delay of about half of a write-data time slot 144 between issue of a write command and issue of the associated write data, the actual data would likely be driven by delay incurred by the computing device 110, and possibly also a timing protocol with respect to when the memory device 120 expects write data from the computing device 110. For example, when the computing device 110 issues a write command from a register file, the actual delay incurred by the computing device 110 might depend on a read sensor associated with that register file; in contrast, when the computing device 110 issues a write command from an instruction pipeline, the actual delay incurred by the computing device 110 might depend on a branch prediction circuit or other circuit associated with decoding an instruction associated with that write command. There is no particular requirement that the actual delay is in fact about half of a write-data time slot 144; it might be shorter or longer.

FIG. 2—Read and Write Transaction Control

Figure 2A:
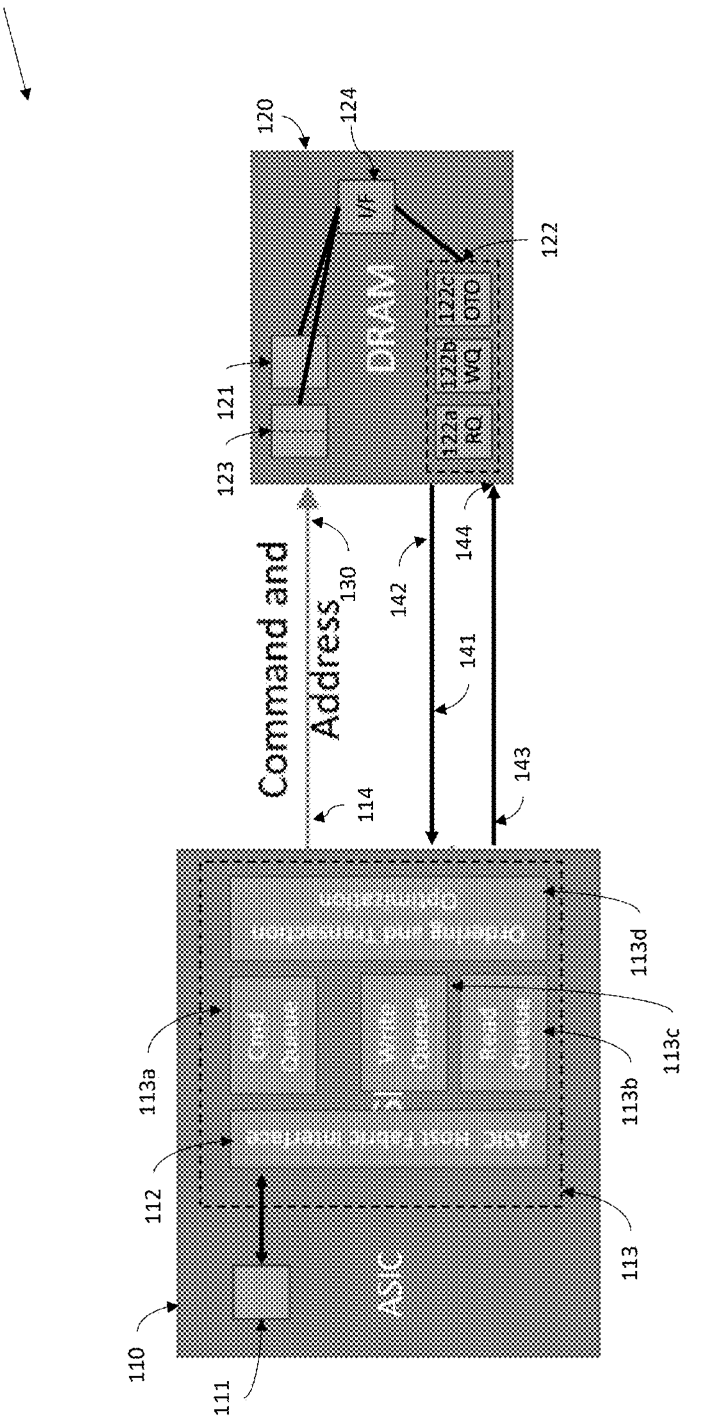
FIG. 2 (collectively including FIGS. 2A-2B) shows a conceptual drawing of a system including an interface between a computing device and a memory using read and write transaction control.
Figure 2B:
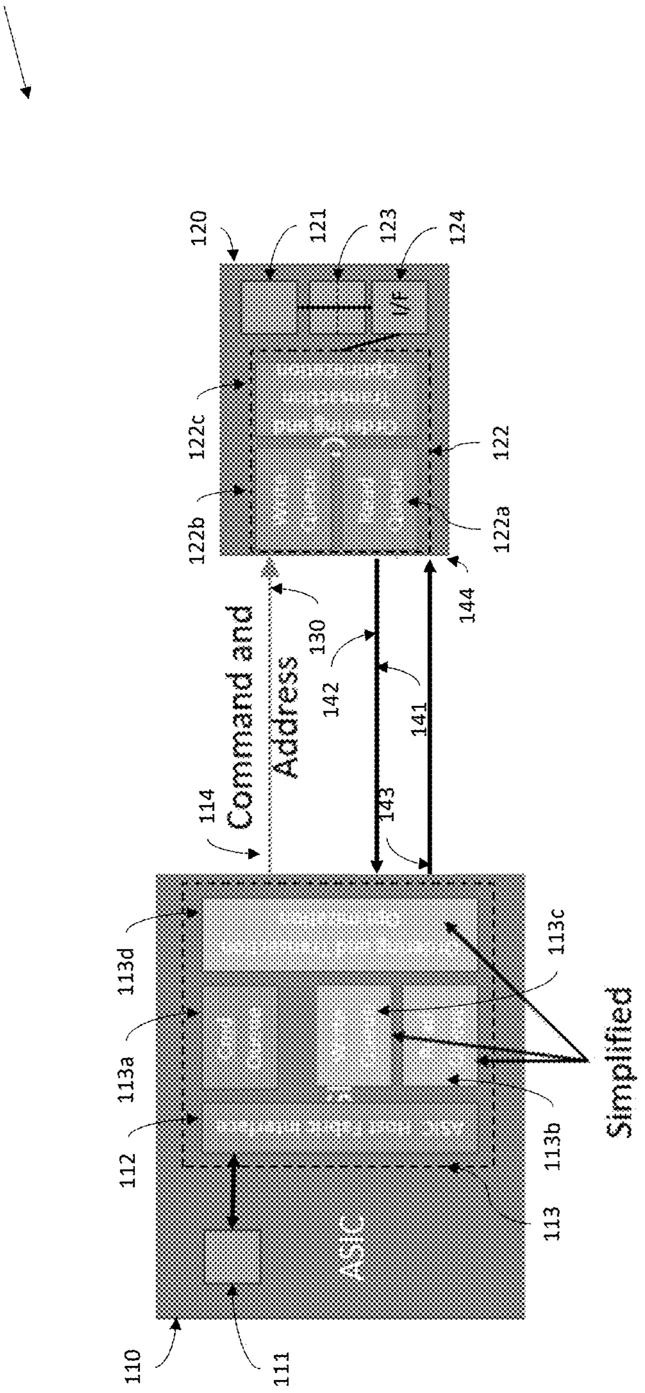

FIG. 2 (collectively including FIGS. 2A-2B) shows a conceptual drawing of a system including an interface between a computing device and a memory using read and write transaction control.

Computing Device Read/Write Commands

In one embodiment, the computing device 110 can include a set of computing circuits 111, disposed to perform the functions of the computing device 110, and a host fabric interface 112, disposed to interface between the computing circuits 111 and a set of communication circuits 113 disposed to communicate with the memory device 120. In one embodiment, the communication circuits 113 can include one or more of:

- A command queue 113*a*, disposed to receive and process read/write commands 114 issued by the computing device 110.
- A read queue 113*b*, disposed to receive data responsive to read commands issued to the memory device 120.
- A write queue 113*c*, disposed to send data associated with write commands issued to the memory device 120.

An ordering/transaction optimization circuit 113*d*, disposed to prioritize, select, and order commands to be issued to (and responses received from) the memory device 120.

In one embodiment, when the computing circuits 111 issue a read/write command 114 to the memory device 120, the host fabric interface 112 transmits that read/write command 114 to the second circuits 113. The communication circuits 113 can receive the read/write command 114 and maintain it in the command queue 113*a* until fully processed.

When the read/write command 114 includes a read command, the communication circuits 113 can transfer the read command to the read queue 113*b*, including a read address associated with the read command.

When the read/write command 114 includes a write command, the communication circuits 113 can transfer the write command to the write queue 113*c*, including a write address and write data associated with the write command.

In one embodiment, when the read/write command 114 arrives at the command queue 113*a*, the ordering/transaction optimization circuit 113*d* can process those read/write commands 114 according to their nature.

When the read/write command 114 includes a new read command, the ordering/transaction optimization circuit 113*d* can be disposed order that new read command according to a priority for that new read command, and for each one in order, to write a "read command" indicator to the command/address bus 130 and write an associated read address to the command/address bus 130. For example, read commands can each be assigned a priority so as to provide that multiple read commands are directed to the same memory bank 123 at the memory device 120 when possible. The "read command" indicator and the associated read address are communicated to the command/address bus 130 to direct the memory device 120 to perform the read operation associated with the read command. When the memory device 120 completes the read operation, the memory device 120 can communicate the read data on the read communication link 141 in a read-data time slot 142, and to raise an alert to inform the computing device 110 that the read operation has been performed. For example, as described herein, the alert informing the computing device 110 can be raised on the command/address bus 130.

For example, in current computing devices 110, the ratio of read-operations to write-operations might not be excessively large, such as about a ratio of about 2:1, but it might occur that the computing device 110 operates more effectively when read operations have priority over write operations a very large fraction of the time, such as about 99% or more of the time. In such cases, it would be generally desirable for read operations to be given priority over write operations almost all of the time, and for write operations to be queued for later performance when read operations are not queued for current performance.

When the read/write command 114 includes a new write command, the ordering/transaction optimization circuit 113*d* can be disposed to order that new write command according to a priority for that new write command, and, for each one in order, to write a "write command" indicator to the command/address bus 130 and write an associated write address to the command/address bus 130. For example, write commands can each be assigned a priority so as to provide that each write command is performed before queued read commands. The "write command" indicator and the associated write address are communicated to the command/address bus 130 to direct the memory device 120 to perform the write operation associated with the write command. The associated write data is communicated on the write communication link 143 in a write-data time slot 144, to be received and processed by the memory device 120. When the memory device 120 completes the write operation, the memory device 120 can raise an alert to inform the computing device 110 that the write operation has been performed. For example, as described herein, the alert informing the computing device 110 can be raised on the command/address bus 130.

For example, in alternative computing devices 110 (not actually the preferred technique currently used in current computing devices 110), it might occur that the computing device 110 operates more effectively when write operations have priority over read operations, so that when read operations are performed, those read operations cause data to be read from the memory device 120 that has been correctly written to the memory device 120. In such cases, it would be generally desirable for write operations to be given priority over read operations, and for read operations to be queued for later performance when write operations have been completed.

As described herein, the computing circuits 113, including the command queue 113*a*, read queue 113*b*, write queue 113*c*, and ordering/transaction optimization circuit 113*d* can be substantially simplified with respect to a format that might been involved if priority ordering and allocation of read/write time slots were performed with respect to a single read/write communication link and were performed on the computing device 110. Allocating the most difficult functions of the computing circuits 113 to the memory device 120 itself can have the effect that substantial complexity, space, and power requirements can be freed for other uses by the computing device 110. Thus, performing priority ordering and allocation of read/write time slots on the memory device 120 can allow the computing circuits 113 on the computing device 110 to be relatively simpler and to occupy relatively less space and involve use of relatively less power.

For example, when the memory device 120 includes its own processing of read/write commands 114 and its own priority ordering thereof, this can have the effect that the computing device 110 can issue read/write commands 114 to the memory device 120 without substantial concern that those read/write commands 114 involve any particular ordering or any particular allocation of time slots on a single communication link for both read/write commands 114. Read commands can be separately issued, in no particularly required sequence, using the read-data time slots 142 on the read communication link 141, while write commands can be separately issued, in no particularly required sequence, using the write-data time slots 144 on the write communication link 143.

Memory Device Read/Write Commands

In one embodiment, the memory device 120 can include a set of memory circuits 121, disposed to perform the functions of the memory device 120, and a memory command interface 124, disposed to interface between the memory circuits 121 and a set of communication circuits 122 disposed to communicate with the computing device 110.

In one embodiment, the memory device 120 can (optionally) include a set of multiple memory banks 123, such as disposed to operate concurrently in response to read/write commands 114 from the memory circuits 121. For example, when the memory device 120 includes 1 Gigabyte (GB) of memory elements (not shown), those memory elements can be disposed as 1,024 parallel memory banks 123 each being 1 Megabyte (MB) in size. For another example, the memory device 120 can include a different number of memory banks 123 having a different substantially uniform size. For another example, the memory device 120 can include a different number of memory banks 123, not having a substantially uniform size, thus, at least some of which have a substantially different size.

In one embodiment, the memory device 120 can (optionally) include a multi-level memory structure, thus having at least some memory elements (not shown) which are relatively faster and likely relatively more expensive or less numerous, and at least some memory elements (not shown) which are relatively slower and likely relatively less expensive or more numerous. For example, the memory device 120 can include a set of cache elements (not shown) disposed to retain memory elements deemed likely to be more frequently accessed, at least in the near term, and a set of non-cache elements (not shown) disposed to retain memory elements deemed likely to be less frequently accessed, at least in the near term.

In one embodiment, the communication circuits 122 can include one or more of:

- A read queue 122*a*, disposed to receive and process read/write commands 114 issued by the computing device 110.
- A write queue 122*b*, disposed to receive and process read/write commands 114 issued by the computing device 110.
- An ordering/transaction optimization circuit 122*c*, disposed to prioritize, select, and order read/write commands 114 to be performed by the memory device 120, and responses issued to the computing device 110.

In one embodiment, the memory device 120 is coupled to the command/address bus 130 and is coupled to the read communication link 141 and to the write communication link 143.

- The read queue 122*a* can be coupled to the read communication link 141. When read commands are issued, in no particularly required sequence, using the read-data time slots 142 on the read communication link 141, the memory device 120 is disposed to receive those read commands at the read queue 122*a*.
- The write queue 122*b* can be coupled to the write communication link 143. When write commands are issued, in no particularly required sequence, using the write-data time slots 144 on the write communication link 143, the memory device 120 is disposed to receive those write commands at the write queue 122*b*.

In one embodiment, when one or more read/write commands 114 are received at one or more of the read queue 122*a* or the write queue 122*b*, the ordering/transaction optimization circuit 122*c* can determine which one or more of those read/write commands 114 is to be given priority order. The ordering/transaction optimization circuit 122*c* couples the read/write command 114 that is given priority order to the memory circuits 121 to be performed.

- When a read command is given priority order, the ordering/transaction optimization circuit 122*c* couples that command to the memory circuit 121 to be performed. The memory circuit 121 performs the read command and communicates the read data to the read queue 122*a*, which communicates the read data to the read communication link 141, to be transmitted to the computing device 110 in a read time slot 142 in response to the associated read/write command 114.
- When a write command is given priority order, the ordering/transaction optimization circuit 122*c* couples that command to the memory circuit 121 to be performed. The memory circuit 121 performs the write command and communicates successful performance to the write queue 122*b*, which communicates successful performance to the write communication link 143, to be transmitted to the computing device 110 as a raised alert on the command/address bus 130 in response to the associated read/write command 114.

For example, when the one or more read/write commands 114 are directed to a set of distinct memory banks 123 associated with the memory device 120, the memory device 120 can assign a priority order to those read/write commands 114 so as to provide that each set of read operations, or each set of write operations, directed to the same memory bank 123, are performed concurrently. This can have the effect that the read/write commands 114 directed to the same memory bank 123 can be performed with relatively greater bandwidth, relatively lesser latency, and/or relatively less power involved in operating the memory bank 123. For example, when a particular memory bank 123 is powered up for one or more read/write commands 114, following accesses (within a selected time duration) to the same memory bank 123 can often involve substantially less power consumption and take substantially less time than if those following accesses were to occur later than that selected time duration.

In one embodiment, when one or more read/write commands 114 are received at one or more of the read queue 122*a* or the write queue 122*b*, it might occur that the ordering/transaction optimization circuit 122*c* determines that both a read command and a write command can be performed concurrently. For example, the memory circuit 121 can perform a read command from a first bank of memory concurrently with performing a write command to a separate and non-overlapping second bank of memory.

- When both a read and a write command can be performed concurrently, the ordering/transaction optimization circuit 122*c* couples those commands to the memory circuit 121 to be performed concurrently. The memory circuit 121 performs both commands; it communicates a result of the read command to the read queue 122*a* and communicates a result of the write command to the write queue 122*b*.
- When the memory circuit 121 performs the read command, it communicates the read data to the read communication link 141, to be transmitted to the computing device 110 in a read time slot 142 in response to the associated read/command 114.
- When the memory circuit 121 performs the write command, it communicates successful performance to the write queue 122*b*, which communicates successful performance to the write communication link 143, to be transmitted to the computing device 110 as a raised alert on the command/address bus 130 in response to the associated read/write command 114.

As described herein, when one or more queues and/or buffers for read/write commands 114, including possibly read operations and/or write operations, are maintained on the memory device 120, the computing device 110 can issue concurrent read/write commands 114, including possibly read operations and/or write operations, without requiring complex ordering or buffering circuitry on the computing device, or at least allowing the computing device to use only relatively simplified ordering or buffering.

Giving Greater Priority Order to Write Commands than Read Commands

In one embodiment, the memory device 120 can give greater priority to read commands than to write commands, such as to provide speed to a computing device 110 that might otherwise wait for write operations to be completed before performing read operations. In such cases, the ordering/transaction optimization circuit 122*c* can give greater priority to read/write commands 114 received at the write queue 122*b* (thus, write commands) than to read/write commands 114 received at the read queue 122*a* (thus, read commands).

In such cases, the write queue 122*b* should be emptied by the memory device 120 at a relatively faster rate than the read queue 122*a* is emptied. This can have the effect that the write queue 122*b* could be emptied substantially immediately upon receipt of write commands. Thus, all pending write commands would be completed before any pending read commands are performed.

With some computing devices 110, instructions might be retrieved from the memory device 120, such as from an instruction portion of program/data memory, and decoded and performed with as little latency as possible. Such computing devices 110 might reorder performance of those instructions so as to minimize latency, and might even perform instructions speculatively (thus, without knowing for sure whether results of those speculative instructions will actually be used). In such cases, when the results of a particular read operation are dependent upon the results of one or more write operations, the computing device 110 might have to wait for the write operation to be completed before performing the read operation. This can have the effect that pending write operations should be completed before performing pending read operations.

Giving Greater Priority Order to Read than Write Commands

In an alternative embodiment, the memory device 120 can give greater priority to read commands than to write commands, such as to provide speed to a computing device 110 that performs many more read operations than write operations. In such cases, the ordering/transaction optimization circuit 112*c* can give priority to read/write commands 114 received at the read queue 122*a* (thus, read commands) over read/write commands 114 received at the write queue 122*b* (thus, write commands).

In such cases, the read queue 122*a* should be emptied by the memory device 120 at a relatively faster rate than the write queue 122*b* is emptied. In ordinary use of many computing devices 110, this might be balanced by the read queue 122*a* also being filled by the computing device 110 at a similar relatively faster rate than the write queue 122*b* is filled.

It might occur that the computing device 110 does not fill the read queue 122*a* as quickly as the memory device 120 empties the read queue 122*a*. The ordering/transaction optimization circuit 112*c* might, given a choice between a relatively empty (or relatively rapidly emptying) read queue 122*a* and a relatively full (or relatively rapidly filling) write queue 122*b*, determine that the write queue 122*b* should be given priority order and can issue a read/write command 114 from the write queue 122*b*.

It might occur that the computing device 110 fills the read queue 122*a* much more quickly than the memory device 120 empties the read queue 122*a*. The ordering/transaction optimization circuit 112*c* might determine that the write queue 122*b* should be given priority order and can issue a read/write command 114 from the write queue 122*b*.

Alternatively, the ordering/transaction optimization circuit 112*c* might decide to maintain excess read/write commands 114 from the write queue 122*b* in alternative storage, such as a write command buffer 115. In such cases, the ordering/transaction optimization circuit 112*c* can be disposed to determine which write commands are the least current priority and can be disposed to move those write commands to the write command buffer 115.

As described herein, because the memory device 120 can perform buffering and priority ordering of read/write commands 114 without explicit instruction by the computing device 110, the computing device 110 can operate without relatively complex circuitry to perform that buffering or priority ordering. For example, the computing device 110 can make do with relatively simple buffering or priority ordering (such as in response to multiple requests for read/write commands 114 from distinct subassemblies within the computing device), or in some cases, with almost no buffering or priority ordering circuitry. This can have the effect that the computing device 110 can allocate space for circuitry, wiring, power, or otherwise, to functions preferred by a designer thereof.

Because the computing device 110 and the memory device 120 can communicate bidirectionally without having to reserve either read time slots 142 or write time slots 144 for delayed responses, the read communication link 141 and the write communication link 143 between the two devices can operate more efficiently and without substantial wasted capacity. This can have the effects that fewer read/write commands 114 are delayed, and that fewer read/write commands 114 are buffered to wait while other operations are performed.

Alternative Embodiments

While this Application primarily describes a systems and techniques that primarily relate to communication between a computing device and a memory device, there is no particular requirement for any such limitation. After reading this Application, those skilled in the art will recognize that the techniques described herein are applicable to a wide variety of devices disposed to issue read and/or write commands, and to a wide variety of devices disposed to respond thereto. For example, the techniques described herein are applicable to a wide variety of different types of devices disposed to maintain information and to provide and/or revise that information upon request or command, such as caching systems and multi-level memory systems; file structures, hash tables, and/or graph structures; artificial intelligence or machine learning training systems; or otherwise as described herein.

Moreover, after reading this Application, those skilled in the art will recognize that the techniques described herein are applicable to a wide variety of different types of devices which can communicate using commands and/or data, and a wide variety of different types of data communication, whether communicated using read/write commands or otherwise. For example, the techniques described herein are applicable to a wide variety of different types of devices which can issue commands to request status of a device, such as possibly submitting a query to a database system or to a search engine, or possibly reading status of a hardware control system or a network monitoring system. For another example, the techniques described herein are applicable to a wide variety of different types of devices which can issue commands to command/respond to control status of a device, such as possibly writing to a database system or posting data to a network application, or such as altering status of a hardware control system or a circuit-switching or packet-switching communication network.

This Application describes a preferred embodiment with preferred process steps and, where applicable, preferred data structures. After reading this Application, those skilled in the art would recognize that, where any calculation or computation is appropriate, embodiments of the description can be implemented using general purpose computing devices or switching processors, special purpose computing devices or switching processors, other circuits adapted to particular process steps and data structures described herein, or combinations or conjunctions thereof, and that implementation of the process steps and data structures described herein would not require undue experimentation or further invention.

The claims are incorporated into the specification as if fully set forth herein.

The invention claimed is:

1. An integrated circuit (IC) memory device, comprising:

storage comprising memory elements;

a command interface to receive a read command, the read command to cause transmission of read data from a first portion of the memory elements, the command interface to receive a write command, the write command to cause receipt of write data to be stored to a second portion of the memory elements;

memory control circuitry to control execution of the read command and the write command;

a read data interface to transmit the read data along a single communication path in response to the IC memory device executing the read command; and a write data interface to receive at least a portion of the write data associated with the write command from the single communication path at a same time as and concurrently with at least a portion of the read data being transmitted along the single communication path.

2. The IC memory device of claim 1, wherein:

the memory control circuitry comprises priority ordering circuitry to associate a priority to the read command and the write command, and configured to reorder execution of the read command and the write command in response to the priority associated with the read command and the write command.

3. The IC memory device of claim 2, wherein:

the priority ordering circuitry prioritizes the read command and the write command to be performed concurrently.

4. The IC memory device of claim 2, wherein:

the priority ordering circuitry comprises buffer circuitry to buffer the read command and the write command based on the priority associated with the read command and the write command.

5. The IC memory device of claim 2, wherein:

the priority ordering circuitry comprises circuitry, after receiving a set of read commands directed to a set of multiple memory banks from a computing device, to associate a priority order with those read commands so as to execute the set of read commands with respect to the set of multiple memory banks.

6. The IC memory device of claim 2, wherein:

the priority ordering circuitry comprises circuitry to reorder memory access operations directed to multiple memory banks of the storage based on a number of operations to be performed by each of the multiple memory banks.

7. The IC memory device of claim 1, wherein:

the read data interface and the write data interface are free from any latency timing constraint to transmit the read data and receive the write data.

8. The IC memory device of claim 1, wherein:

the IC memory device comprises one of a dynamic random access memory (DRAM) device and a high-bandwidth memory (HBM).

9. The IC memory device of claim 1, wherein:

the command interface is configured to receive the read command and the write command from a computing device that is external to the IC memory device.

10. A memory chiplet, comprising:

storage comprising memory elements;

a command interface to receive a read command, the read command to cause transmission of read data from a first portion of the memory elements, the command interface to receive a write command, the write command to cause receipt of write data to be stored to a second portion of the memory elements, the command interface configured to receive the read command and the write command from a computing chiplet;

memory control circuitry to control execution of the read command and the write command;

a read data interface to transmit the read data along a single communication path to the computing chiplet in response to the memory chiplet executing the read command; and a write data interface to receive at least a portion of the write data associated with the write command from the computing chiplet via the single communication path at a same time as and concurrently with at least a portion of the read data being transmitted along the single communication path.

11. The memory chiplet of claim 10, wherein:

the memory control circuitry comprises priority ordering circuitry to associate a priority to the read command and the write command, and configured to reorder execution of the read command and the write command in response to the priority associated with the read command and the write command.

12. The memory chiplet of claim 11, wherein:

the priority ordering circuitry prioritizes the read command and the write command to be performed concurrently.

13. The memory chiplet of claim 11, wherein:

the priority ordering circuitry comprises buffer circuitry to buffer the read command and the write command based on the priority associated with the read command and the write command.

14. The memory chiplet of claim 11, wherein:

the priority ordering circuitry comprises circuitry, after receiving a set of read commands directed to a set of multiple memory banks from a computing device, to associate a priority order with those read commands so as to execute the set of read commands with respect to the set of multiple memory banks.

15. The memory chiplet of claim 11, wherein:

the priority ordering circuitry comprises circuitry to reorder memory access operations directed to multiple memory banks of the storage based on a number of operations to be performed by each of the multiple memory banks.

16. The memory chiplet of claim 10, wherein:

the read data interface and the write data interface are free from any latency timing constraint to transmit the read data and receive the write data.

17. The memory chiplet of claim 10, wherein:

the memory chiplet comprises one of a dynamic random access memory (DRAM) device and a high-bandwidth memory (HBM).

18. The memory chiplet of claim 10, wherein:

the command interface is configured to receive the read command and the write command from a computing device that is external to the memory chiplet.

19. A method of operation in an integrated circuit (IC) memory device, comprising:

receiving, via a command interface, a read command, the read command to cause transmission of read data, and a write command, the write command to cause receipt of write data, the read command and the write command originating from a computing device that is external to the IC memory device;

controlling, via priority ordering circuitry, a priority to the read command and the write command, and reordering execution of the read command and the write command in response to the priority associated with the read command and the write command;

transmitting, via a read data interface, the read data along a single communication path in response to the IC memory device executing the read command; and receiving, via a write date interface, at least a portion of the write data associated with the write command from the single communication path at a same time as and concurrently with at least a portion of the read data being transmitted along the single communication path.

20. The method of claim 19, wherein the reordering comprises:

operating the priority ordering circuitry independent of the computing device.

* * * * *